United States Patent [19]
Childress et al.

[11] Patent Number: 4,791,081
[45] Date of Patent: Dec. 13, 1988

[54] SUPPORTED FLUOROCARBONSULFONIC ACID POLYMERS AND AN IMPROVED METHOD FOR THEIR PREPARATION

[75] Inventors: David L. Childress, La Grange; John D. Weaver; Emmett L. Tasset, both of Lake Jackson, all of Tex.

[73] Assignee: The Dow Chemical Company, Midland, Mich.

[21] Appl. No.: 947,788

[22] Filed: Dec. 30, 1986

Related U.S. Application Data

[63] Continuation-in-part of Ser. No. 832,626, Feb. 25, 1986, abandoned.

[51] Int. Cl.[4] ............................................. B01J 31/06
[52] U.S. Cl. ...................................... 502/62; 502/159
[58] Field of Search .................................. 502/159, 62

[56] References Cited

U.S. PATENT DOCUMENTS 4,038,213  7/1977  McClure et al. ..................... 502/159
4,303,551  12/1981  Vaughan ............................. 502/159
4,414,146  11/1983  Olechowski et al. ........... 502/159 X Primary Examiner—Patrick P. Garvin
Attorney, Agent, or Firm—Gunn, Lee & Jackson

[57] ABSTRACT

This invention discloses improved heterogeneous acid catalysts and a method for preparing these catalysts. A heterogeneous acid catalyst has been prepared by coating a carrier with an aqueous emulsion containing a fluorocarbonsulfonic acid polymer in the sulfonyl fluoride form, removing the excess water, heating to a temperature above the softening point of the polymer for a time, and then converting the polymer to the active sulfonic acid form. The substrate has pores of about 0.1 micrometers or greater and a surface area of about 20 $m^2/g$ or less.

16 Claims, No Drawings

SUPPORTED FLUOROCARBONSULFONIC ACID POLYMERS AND AN IMPROVED METHOD FOR THEIR PREPARATION

BACKGROUND OF THE DISCLOSURE

This disclosure is a continuation-in-part of application Ser. No. 832,626 filed Feb. 25, 1986 now abandoned.

The polymers of interest to this invention are substantially fluorinated and have pendant chains containing sulfonic acid groups or derivatives of sulfonic acid groups. The sulfonic acid groups exhibit extraordinarily high acid strength compared to sulfonic acids that are not fluorinated. Therefore, these materials are very useful as strong acid catalysts and have been shown to be effective in catalyzing many different reactions, such as: hydration of olefins and epoxides, dehydration of alcohols, alkylation and acylation of aromatic hydrocarbons, isomerization and alkylation of paraffins, nitration of organics, pinacolone rearrangements, esterification of carboxylic acids, hydrolysis of carboxylic acid derivatives, and Diels-Alder condensations. Some metal salts of fluorocarbonsulfonic acids, such as those in U.S. Pat. No. 4,446,329, also have been shown to be useful in catalyzing some reactions.

Fluorocarbon polymers with sulfonic acid pendant groups have advantages over other types of acid catalysts in that the fluorocarbon portion gives extraordinary chemical and thermal stability, as well as almost complete insolubility in most systems. Therefore, the polymer can be used as a heterogeneous catalyst and can be recovered very easily and reused.

Reactions that are catalyzed by fluorocarbonsulfonic acid polymers can occur at or near the catalyst surface. The extent to which the reactants can diffuse beneath the surface of the catalyst to contact acid groups is dependent on several factors, including the polarity of the reaction medium and the equivalent weight of the fluorocarbon polymer. In some instances, portions of the catalyst beneath the surface are inaccessible to the reactants because diffusion is limited, which results in an inefficient use of the polymer. Therefore, to obtain optimum catalytic efficiency, it is desirable to increase the surface area of the catalyst to such a point that reactivity is not limited by diffusion and that all of the acid groups are accessible to the reactants. Catalytic efficiency is defined as the amount of product that is produced divided by the amount of catalyst that is used. The process of this invention of applying a coating of polymer to a carrier increases the ratio of active surface area to weight of polymer compared to that for an unsupported polymer catalyst. Simply increasing the surface area per weight will not provide improved performance.

In the prior art, increasing the surface area of a fluorocarbon polymer has been accomplished by several methods, all of which have inherent disadvantages. By decreasing the particle size of a solid, the surface area is increased. However, the disadvantages of using a fine particulate catalyst include poor flow dynamics, plugging problems, loss of catalyst by entrainment, and more difficult catalyst recovery.

As an example of one prior art enhancement, the fluorocarbon can be extruded into tubing while it is in the thermoplastic sulfonyl fluoride ($SO_2F$) form, then converted to the sulfonic acid. Extrusion into tubing requires expensive, specialized equipment and careful handling of the fragile material during processing and reactor assembly. Furthermore, the mechanical strength of the polymer is such that tubing with a wall thickness less than about 0.005 inches (0.125 mm) becomes impractical. This results in only a modest surface area to weight ratio.

The polymer in the thermoplastic sulfonyl fluoride form can be melt deposited onto a solid substrate, and then the surface layer can be converted to the sulfonic acid. This process also requires specialized equipment to form the catalyst to the desired shape of the substrate. Only the portion of the polymer on the surface is used in the catalytic process since the subsurface portion must remain in the $SO_2F$ form to remain bonded to the substrate. This is an inefficient use of the expensive polymer. As taught herein, optimum limits exist for such coatings.

Although the fluorocarbon polymers of interest to this invention are considered substantially insoluble, it is known that dilute solutions of these polymers in the sulfonic acid form can be prepared in an alcohol solvent. In U.S. Pat. No. 4,038,213, such a polymer solution is used to coat a porous support to prepare a catalyst composition. The patent teaches that, in order for the catalyst to have high activity, the porous support should possess high surface area (300 $m^2/g$, for example) and an average pore diameter of less than 600 Å (0.06 micrometers).

However, when a fluorocarbonsulfonic acid polymer is dissolved in an alcohol solvent, the polymer is converted from a substantially insoluble species to a species that is very soluble in many polar compounds. Therefore, a supported catalyst composition that is prepared by the method described in U.S. Pat. No. 4,038,213 has only limited utility, since the polymer coating redissolves very easily.

In the present invention, an improved supported acid catalyst composition is disclosed which has surprisingly high catalytic activity and is very resistant to activity loss caused by loss of the polymer coating. A unique feature of the present invention is that, contrary to what is taught in U.S. Pat. No. 4,038,213, high surface area is not necessary, and it is preferable to use a support having an average pore diameter of 1000 Å (0.1 micrometers) or greater. For example, a catalyst support that is especially useful is Norton SA-5205 alumina, which has an average pore diameter of approximately 130 micrometers and surface area of approximately 0.01 $m^2/g$. It is unobvious and unexpected from the prior art that a catalyst having low surface area and large average pore diameter would give such high catalytic activity.

Another novel feature of this invention is the process of depositing the polymer onto a support from a dispersion that contains the polymer in the sulfonyl fluoride form. Representative fluorinated polymers having sulfonyl functional groups, such as those described in U.S. Pat. Nos. 3,282,875; 4,329,435; 4,330,654; and 4,358,545, can be prepared by emulsion polymerization. Typically, the aqueous latex from the emulsion polymerization contains the emulsified polymer in its sulfonyl fluoride form as spherical particles with an average diameter of from 0.001 micrometers to about 10 micrometers. In the present invention, a support having an average pore diameter greater than 0.1 micrometer is treated with this aqueous latex, so that the emulsified polymer particles are adsorbed onto the walls throughout the support. The excess water is removed, the coated support is heated to a temperature to melt the thermoplastic polymer, causing it to flow and become molded to the walls of the support. The polymer is then converted by hydrolysis to the sulfonic acid or sulfonate form, which has catalytic activity. The resulting composition is an improved supported acid catalyst that is more resistant to loss of polymer by leaching than other materials in the prior art.

DETAILED DESCRIPTION OF THE INVENTION

This invention discloses improved heterogeneous acid catalysts and a novel, unobvious method of preparing these catalysts. The method of preparation involves treating a carrier material with a dispersion containing a fluorocarbon polymer in the sulfonyl fluoride form, removing the dispersing medium, and converting the polymer to the active sulfonic acid or sulfonate form. The polymer dispersion may be in a hydrophilic organic compound, such as is described in U.S. Pat. No. 4,341,685. However, for safety and convenience, it is preferable to use an aqueous dispersion of the polymer, such as is obtained from an emulsion polymerization. The use of the polymer in the sulfonyl fluoride form in a dispersion comprises an improvement in the preparation of a heterogenous catalyst, in that this form of the polymer is thermoplastic, and therefore, it can be melted and become fused to the carrier surface. The ease and convenience with which a catalyst can be prepared by this method comprises a further improvement in catalyst preparation.

The polymers that are applicable to this invention have structures that include a substantially fluorinated carbon chain that has attached to it side chains that are also substantially fluorinated and contain sulfonic acid groups or derivatives of sulfonic acid groups. They may contain sulfonate salts of metals, such as iron, aluminum, zinc, copper, chromium, and others. There may be other side chains present that do not contain sulfonic acid groups, if desired, such as fluorinated alkyl or ether chains with no other functional group attached to them. There also may be atoms present in these chains other than carbon and fluorine, such as oxygen, chlorine, and bromine. Examples of these polymers are those described in U.S. Pat. Nos. 3,282,875; 4,329,435; 4,330,654 and 4,358,545. The fluorocarbon portion of the polymer molecule contributes such desirable properties as high thermal and chemical stability and low solubility. The sulfonic acid groups exhibit extraordinarily high acid strength compared to sulfonic acids that are not fluorinated. Therefore, these materials are very useful as strong acid catalysts and they have been shown to be effective in catalyzing many different types of reactions.

Typical polymers that may be used in this invention have the general structure described below:

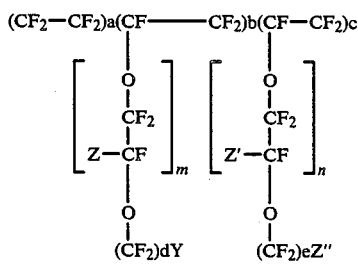

where:
Y is $SO_2F$, $SO_3H$, or any group easily converted to $SO_3H$;
Z, Z', and Z" are independently F, Cl, Br, $CF_3$, $CF_2Cl$, or fluorinated alkyl;
the ratio of a/b varies from about 2 to about 50;
c is 0 or greater than 0;
m and n are independently 0 to 4; and
d and e are independently 2 to 5.

In the identified variables, the value of a variable at one location in the formula does not limit the value at another location in the formula. At the various occurrences of the m, n, d or e, the values can be equal or different. The same is true of the radical Z at the various locations. In that sense, the values are said to be "independent".

Since reactions involving heterogeneous catalysts can occur at or near the surface of the catalyst, it is desirable to increase the active surface area of the catalyst in order to obtain optimum catalytic efficiency. Several attempts at this have been made in the prior art, but each attempt results in inherent disadvantages. In this invention, novel and unobvious processes are disclosed for supporting a sulfonyl functional fluorinated polymer on a support, thereby creating a catalyst with more active surface area and improved durability.

Fluorinated polymers with sulfonyl functional groups can be prepared by emulsion polymerization, as described in U.S. Pat. Nos. 4,330,654 and 4,358,545. In the present invention, the aqueous latex from the emulsion polymerization contains the polymer in the sulfonyl fluoride form, which is thermoplastic. A support is treated with aqueous latex containing polymer so that the emulsified polymer particles are adsorbed onto the walls of the support. Excess water from the latex is removed, and the coated support is heated to the melt temperature of the thermoplastic polymer, molding the polymer to the walls of the support. The polymer is converted by hydrolysis to the sulfonic acid form, which can then function as an acid catalyst.

In this invention, the use of the aqueous latex from the emulsion polymerization process results in several unique advantages. The latex typically contains the emulsified polymer as spherical particles with average size ranging from 0.001 micrometers to 10 micrometers in diameter. However, larger or smaller particles can be obtained if desired. This small particle size allows the polymer to penetrate into the pores and crevices of a catalyst support. Once the support has been impregnated with the polymer, the aqueous phase is evaporated and the polymer particles are deposited onto the support material. Because the sulfonyl fluoride form of the polymer is thermoplastic, the burdened support can be heated above the melt point of the polymer, causing the particles to flow together and become bonded to each other. This results in a uniform thin coating of polymer inside the pores of the support which is more resistant to leaching than a coating of particulate unmelted polymer.

Another advantage unique to this system is that the concentration of polymer in the latex can be varied over a wide range. Preparation of solvent solutions of fluorinated sulfonyl functional polymers described in the prior art requires high temperature and pressure equipment, and they are limited in concentration to a maximum of about 5 weight percent solids. In contrast, the latex can be obtained with a polymer concentration as high as 50% or higher. The usual operative range is 15% to 30% and the concentration can be adjusted further by the addition or removal of water. This large range allows the loading of the polymer on the support to be adjusted very conveniently without the need to handle large volumes of solutions.

A further advantage to this method is that the polymer can be used directly from the latex in which it is prepared. Polymer isolation, purification, and redissolution processes are avoided, thus eliminating much of the difficulty and expense of preparing a supported catalyst. And since the latex is aqueous, the handling of hazardous liquid materials is eliminated.

The composition of the carrier is not critical, and the properties that are considered desirable for a carrier may vary in different application. Properties that may be important in some situations include high crush strength, high porosity, chemical resistance, thermal stability, and low cost. In U.S. Pat. No. 4,038,213, it is taught that the carrier should have high surface area and an average pore diameter of less than 0.06 micrometers. In fact, this is not the case. A support with low surface area, less than 1 m$^2$/g, can be used to prepare a catalyst with surprisingly high catalytic efficiency. The preferred surface area range is about 20 m$^2$/g or less. For supporting the polymer by the present coating method, it is preferable for the support to have an average pore diameter greater than 0.10 micrometers in order to accommodate the polymer particle size in the latex. In all cases, the carrier must be resistant to the aqueous polymer latex and to the high temperature reached during the bonding procedure. Some representative materials that can serve as carriers include alumina, silica, zeolites, silicon carbide, silica-alumina, porous glass, ceramic, spinel, clay, and carbon. The preferred amount of polymer to support is between 0.1 and 50 weight percent, preferably, up to about 25 percent. The optimum amount of polymer on the support is dependent on a number of variables including the specific gravity of the support, the pore size and the properties of the reaction medium. In general, the productivity in a reaction should increase as the amount of polymer increases up to the optimum amount. Above this amount portions of the polymer become increasingly inaccessible to the reactants and the efficiency of the catalyst decreases. It is preferred therefore that the weight percent polymer on the support should not exceed the optimum level for the particular support and the particular reaction being catalyzed. For alumina supports described herein, the optimum level may be as low as 13-15 weight percent while the optimum for silicon carbide supports may be 20-25 weight percent. For given reactions and given supports, this optimum amount can vary over wide ranges up to as high as 50 weight percent. There may be instances in which the compositions prepared by the processes of this invention may be used for applications other than acid catalysis. In these instances, the carriers may be of some form or material other than those described above.

The following examples are illustrative of certain specific embodiments of this invention.

Example 1

This example discloses the method of preparing a heterogeneous acid catalyst by coating a carrier with an aqueous latex of polymer derived from emulsion polymerization. One product obtained from the emulsion polymerization of tetrafluoroethylene with $CF_2=CFOCF_2CF_2SO_2F$ was an aqueous latex containing about 29 wt% polymer solids with equivalent weight of abut 800 gm/eq. The latex (3.5 gm) was diluted to 15 ml with water and added to 20 gm of various selected predried supports. The excess water was removed by heating on a hot plate with gentle stirring. Then the burdened support was heated to 250° for 20 minutes in an oven. The product was mixed with 100 ml of 20% NaOH and was stirred and heated for 90 minutes and then stirred at room temperature overnight. The pellets were filtered and charged to an ion exchange column. They were washed with water until the eluent was neutral, and then the polymer was converted to the acid form by treatment with 500 ml of 3N HCl. The acidified particles were washed and dried. Polymer loading, as shown in Table I, was determined by weight gain.

TABLE I

| Sample | Support Type | Average Pore Diameter Micrometers | Untreated Support | Burdened Support | Polymer Loading |
|---|---|---|---|---|---|
| A | Alumina | 1.2 | 20.0 g | 21.0 g | 4.8 wt % |
| B | Alumina | 130 | 20.0 | 21.0 | 4.8 |
| C | Alumina | 130 | 22.0 | 22.9 | 3.9 |
| D | Silicon carbide | 50 | 20.0 | 20.9 | 3.9 |

Example 2

The polymer emulsion used in Example 1 was added without dilution to 20.0 g of a silicon carbide support, which had an average pore diameter of approximately 50 micrometers. After several minutes, the burdened support was baked, hydrolyzed, and acidified as in Example 1. The weight of the burdened support was 23.2 g, accounting for 13.8 wt% loading.

Example 3

Samples of the supported catalyst prepared in Examples 1 and 2 were titrated with 0.01N NaOH to determine acid content. The polymer loading determined by titration, as shown in Table II, agrees closely with that determined by weight gain in the previous examples. This shows that the polymer was not leached from the support during processing.

TABLE II

| Sample | Sample Size | Acid Capacity | Polymer Loading wt | wt % |
|---|---|---|---|---|
| B | 1018.3 mg | 0.0615 meq | 49.20 mg | 4.8 |
| C | 1008.5 | 0.0510 | 40.80 | 4.0 |
| D | 1069.7 | 0.0562 | 44.96 | 4.2 |
| Ex. 2 | 197.2 | 0.0391 | 31.28 | 15.9 |

Example 4

The utility of the supported acid catalyst prepared in Example 1 was demonstrated by this example. A 50 ml flask with a still head was charged with 1.0 g of supported catalyst from Sample D of Example 1 and with 32.2 g (369 millimoles) of 1,4-butanediol. The mixture was heated to 165° C. and the volatile products were distilled off. The distillate was analyzed, showing a mixture of tetrahydrofuran and water. As further example of the utility of the catalyst, a composition with a polymer loading of 4.4 wt% on alumina was prepared as in Example 1. It was loaded into a reactor tube and heated to 150° C. Propylene and water in a mole ratio of 1/7 were fed to the reactor. The product stream contained 2-propanol in about 99% selectivity.

Example 5

This example demonstrates the improved catalytic efficiency that is obtained by supporting the polymer on a carrier.

The carrier was a 1/16" spherical alumina that had an average pore diameter of approximately 8 micrometers and surface area of approximately 0.25 $m^2/g$. The fluorocarbon polymer was the same as that used in Example 1, except that its equivalent weight was 935. The titrated acid capacity of the composition was 0.165 meq/g. This catalyst (2 g, 0.33 meq) was mixed with 90 mmoles of benzene and 60 mmoles of 1-decene at 85° C. for 60 minutes, giving 87% conversion of decene.

Comparative Example I

In this comparative example, Nafion NR 50 catalyst, a commercial unsupported fluorocarbonsulfonic acid polymer (10–35 mesh, equivalent weight 1100; 0.36 g, 0.33 meq) was used to catalyze the reaction of 90 mmoles of benzene and 60 mmoles of 1-decene at 85° C., as described in Example 5. After 60 minutes, the conversion of decene was 4%. Nafion is a trademark of E. I. du Pont.

Example 6

In this example, a catalyst carrier was coated with progressively heavier coatings of the fluorocarbon polymer that was used in Example 1, thereby reducing the ratio of surface area to weight of polymer. The carrier was the same as in Example 5.

Four catalyst compositions were prepared. Each was used to catalyze the reaction of diphenyl oxide (11.3 g, 66 mmoles) with dodecene (3.7 g, 22 mmoles) at 145° C. The conversion of dodecene was determined after 18 minutes, 33 minutes, and 60 minutes. The results are described in Table III below.

The reactivities of catalyst samples E, F, and G increase with the amount of polymer that is present, even though they have very low surface areas. This indicates that all of the polymer on each sample is accessible and is being used as a catalyst, and an increase in surface area will not improve their performance in this reaction. Thus, the catalytic efficiencies of these samples are high. Samples G and H have about the same reactivity, even though sample H has about 60% more polymer present. This indicates that the optimum polymer coating on sample H has been exceeded, resulting in a less efficient use of the polymer. An increase in surface area would improve sample H.

TABLE III

| Sample | Polymer Coating | Wt. Catalyst Used | Dodecene Conversion 18 min | 33 min | 60 min |
|---|---|---|---|---|---|
| E | 3.6% | 2.3 g | 24% | 39% | 52% |
| F | 5.4 | 2.2 | 30 | 47 | 70 |
| G | 13.4 | 2.1 | 50 | 73 | 90 |
| H | 21.8 | 2.2 | 47 | 72 | 90 |

Example 7

A silicon carbide catalyst carrier (5–6 mm spheres), which had an average pore diameter of about 50 micrometers, was coated with an aqueous latex containing the fluorocarbon polymer that was used in Example 1 (40% solids, equivalent weight 902). The finished catalyst contained 13.8 wt% polymer on the support and had an acid capacity of 0.153 meq/g.

Toluene (15.46 g, 168 mmoles) and this catalyst composition (0.209 g, 0.32 meq) were placed in a flask and stirred mechanically while it was heated to 100° C. When this temperature was reached, 8.33 g (85 mmoles) of 1-heptene were added to the mixture and stirring was continued for 90 minutes. After this time, the reaction mixture was analyzed by gas chromatography to determine the amount of heptene that had reacted. The conversion of heptene was 65.8%.

In the following comparative examples, supported catalysts are prepared by coating supports, which have high surface area and small pore sizes, with a solution of Nafion resin (approximately 5 wt% in ethanol, equivalent weight 1100) that is available commercially. The catalytic efficiencies of these catalysts are shown to be lower than that of the catalyst of the present invention.

Comparative Example II

An alumina catalyst support (1/16" spheres, 4.62 g), which had a surface area of about 125 $m^2/g$ and an average pore diameter of about 0.014 micrometers, was treated with a solution of Nafion in ethanol. The solvent was evaporated under vacuum, leaving 5.04 g of coated support. This gave a catalyst that contained 8.01 wt% Nafion (0.0728 meq/g).

This catalyst (3.85 g, 0.28 meq) was used to catalyze the reaction of toluene (15.54 g, 169 mmoles) and 1-heptene (8.36 g, 85 mmoles) by the procedure that is described in Example 7. The conversion of heptene after 90 minutes was 9.6%.

Comparative Example III

In this comparative example, 9.25 g of Davison RD silica gel beads (surface area 770 $m^2/g$; average pore diameter 0.008 micrometers; 10–30 mesh) were coated with a solution of Nafion in ethanol. After the solvent was evaporated under vacuum, there were 10.30 g of supported catalyst (10.19 wt% Nafion, 0.0926 meq/g).

Toluene (15.57 g, 169 mmoles) and 1-heptene (8.35 g, 85 mmoles) were reacted under the conditions described in Example 7, using 3.09 g (0.30 meq) of this composition as the catalyst. After 90 minutes, the conversion of heptene was 16.6%.

The coated catalyst is somewhat temperature sensitive compared to the supportive carrier. The carrier selected should be stable to some selected high temperature. The coating placed on the carrier should not be heated so hot that thermal breakdown occurs. Rather, a reasonable heating range is at least about 100° C. and upward perhaps to 400° C. A more desirable range is about 225° C. to 325° C. In general terms, coating damage at the elevated temperature should determine the upper limit.

While the foregoing is directed to the preferred embodiments of the present invention, other and further embodiments of the invention may be devised without departing from the basic scope thereof, and the scope thereof is determined by the claims which follows.

What is claimed is:

1. The composition comprising a fluorinated polymer having pendant sulfonic acid groups, or halogen derivatives of sulfonic acid groups, on a support which support has an average pore diameter greater that about 0.1 micrometer and a surface area of less than about 20 $m^2/g$.

2. The composition of claim 1 wherein the fluorinated polymer of claim 1 has the structure:

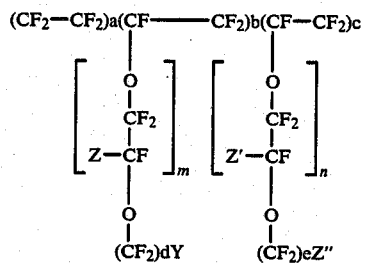

where:
Y is SO$_3$H, or any group easily converted to SO$_3$H;
Z, Z', and Z" are independently F, Cl, Br, CF$_3$, CF$_2$Cl, or fluorinated alkyl;
the ratio of a/b varies from about 2 to about 50;
c is 0 or greater than 0;
m and n are independently 0 to 4; and
d and e are independently 2 to 5.

3. The composition of matter of claim 2 wherein c=0, m=0 and d=2.

4. The composition of matter of claim 2 wherein Z" is CF$_2$Cl.

5. The composition of matter of claim 2 wherein the support is alumina, silica, zeolites, silicon carbide, silica-alumina, porous glass, ceramic, spinel, clay, or carbon.

6. The composition of matter of claim 1 wherein the weight percent ratio of polymer on support is about 0.1 to 50 weight percent.

7. The composition of matter of claim 6 wherein the weight percent is up to about 25 weight percent.

8. The composition of matter of claim 1 wherein average pore diameter is at least 50 micrometers.

9. The composition of matter of claim 1 wherein the surface area is about ¼ m$^2$/g.

10. The method of supporting a fluorinated polymer having pendant chains containing sulfonyl groups on a support, the method comprising the steps:
(a) soaking a substrate having a pore size of at least about 0.1 micrometer and a surface area of less than about 20 m$^2$/g with a dispersion that contains a fluorinated polymer which has pendant chains containing sulfonyl groups;
(b) removing the dispersing medium from the mixture; and
(c) converting the sulfonyl groups to sulfonic acid or sulfonate groups.

11. The method of claim 10 wherein the dispersing medium is water.

12. The method of claim 10 wherein the coated support is heated to melt the sulfonyl form of the polymer prior to converting the sulfonyl groups to sulfonic acid or sulfonate groups.

13. The method of claim 11 wherein the coated support is heated to between 100° C. and 400° C.

14. The method of claim 10 wherein fluorinated polymer has pendant chains with the structure:

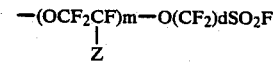

where
Z is F, Cl, Br, CF$_3$, CF$_2$Cl, or fluorinated alkyl;
m is 0 to 4; and
d is 2 to 5.

15. The method of claim 10 wherein the support is alumina, silica, zeolites, silicon carbide, silica-alumina, porous glass, ceramic, spinel, clay or carbon.

16. The method of claim 10 wherein the substrate has a pore size of at least about 0.1 micrometer and a surface area of less than about 20 m$^2$/g.

* * * * *